Sept. 16, 1941.  E. H. SCHULTZ  2,255,987
AUTOMOBILE REPAIR EQUIPMENT
Filed Dec. 19, 1938
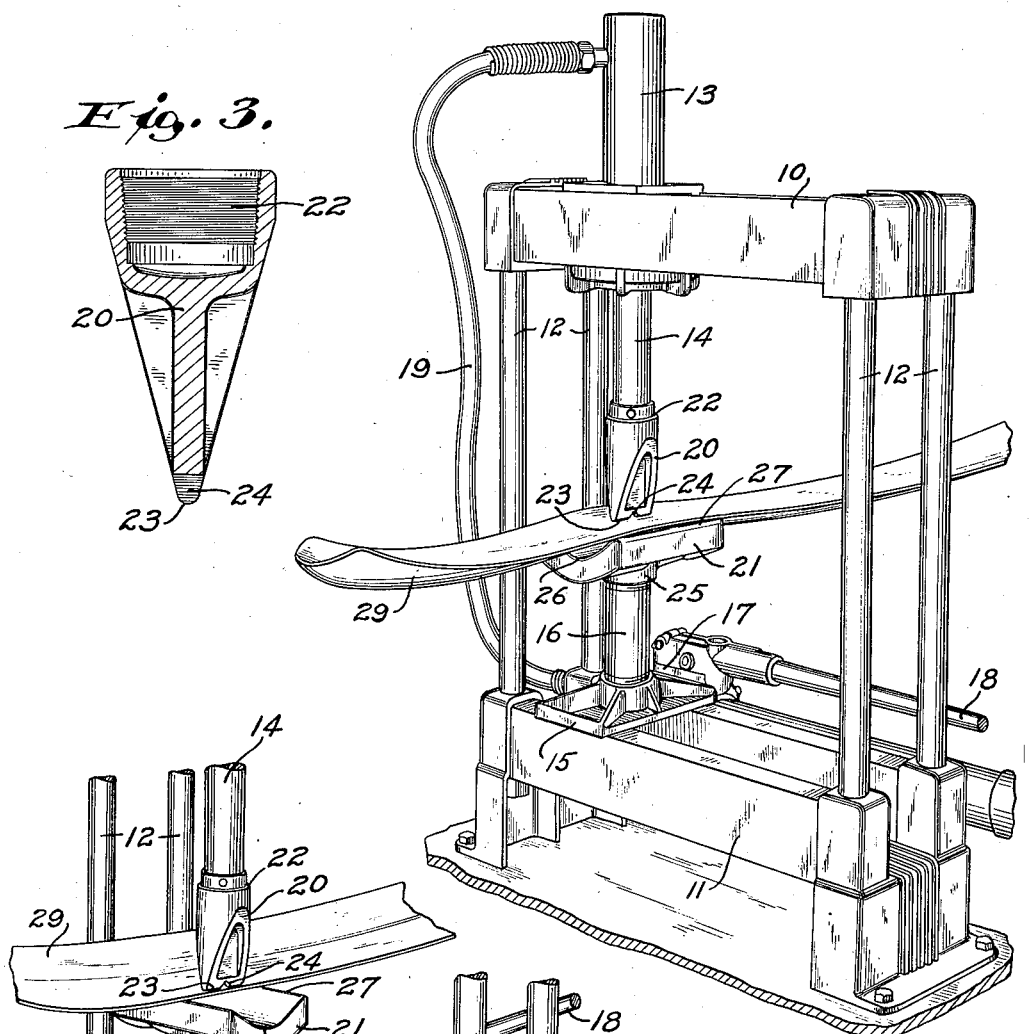
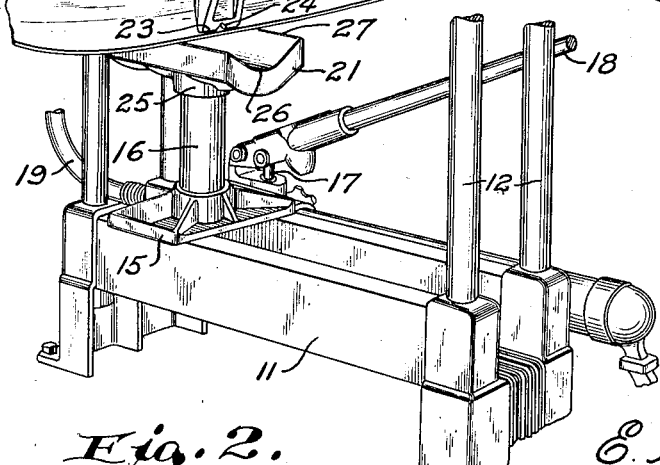
INVENTOR.
E. H. Schultz
BY Morsell, Lieber & Morsell
ATTORNEYS.

Patented Sept. 16, 1941

2,255,987

UNITED STATES PATENT OFFICE 2,255,987

AUTOMOBILE REPAIR EQUIPMENT

Edward H. Schultz, Milwaukee, Wis., assignor to Blackhawk Mfg. Co., Milwaukee, Wis., a corporation of Wisconsin Application December 19, 1938, Serial No. 246,571

5 Claims. (Cl. 153—48)

My present invention relates in general to improvements in equipment for repairing automobile parts, and relates more specifically to improved apparatus for straightening bumpers or the like.

An object of the present invention is to provide simple and readily manipulable apparatus for straightening and repairing damaged elongated bodies such as automobile bumpers, in an expeditious manner.

While the art of repairing damaged automobile parts has become quite highly developed in recent years, considerable difficulty has up to the present time been encountered in attempting to straighten and restore badly twisted and bent elongated relatively heavy sheet metal bars, such as bumpers. The ordinary present-day bumper comprises a rather long and comparatively wide heavy bar formed of sheet steel or the like, and curved both longitudinally and transversely; and so far as known, the prior repair equipment is not adapted to quickly and effectively restore the normal shape of distorted bumpers of this type, except by numerous tedious operations. While power applying jacks of various kinds have heretofore been utilized in an effort to repair such damaged bumpers, the absence of proper tools adapted for use in conjunction with these jacks, has made it impossible to apply the forces in a most effective manner, and has made the cost of effecting such repairs excessively high.

It is therefore a more specific object of my present invention to provide new and useful equipment which is effectively cooperable with a power applying jack or press, to quickly and conveniently restore even badly distorted bumpers or similar parts to their normal shape and true original curvature.

Another specific object of my invention is to provide simple and relatively inexpensive equipment for expeditiously removing kinks and distortions from relatively heavy sheet metal bars such as automobile bumpers.

A further specific object of this invention is to provide a set of tools which may be caused to cooperate with a power press or jack to restore either longitudinal or transverse curvature to an elongated object such as a bumper bar which has been damaged.

Still another specific object of the invention is to provide improved repair apparatus for damaged or distorted automobile parts or the like, which may be effectively manipulated by a novice.

These and other specific objects and advantages will be apparent from the following detailed description.

A clear conception of several embodiments of my present invention, and of the mode of constructing and of utilizing equipment built in accordance with the improvement, may be had by referring to the drawing accompanying and forming a part of this specification wherein like reference characters designate the same or similar parts in the various views.

Fig. 1 is a perspective view of a stationary press assemblage having my improved equipment associated therewith, and showing the apparatus in the act of restoring both longitudinal and transverse curvature to a damaged bumper bar;

Fig. 2 is a fragment of a similar perspective, showing the apparatus in the act of restoring slight longitudinal curvature alone, to a bumper; and Fig. 3 is an enlarged central longitudinal section through one type of my improved plunger member.

While I have shown the improved equipment as being especially adapted for use in conjunction with a power press or jack of the hydraulic type, it is not intended to thereby unnecessarily restrict the scope or applicability of the improvement.

Referring to the drawing, the stationary hydraulic press assemblage shown in Figs. 1 and 2 is of a well known type and comprises in general a normally stationary frame having upper and lower cross-beams 10, 11 respectively interconnected by upright columns 12; a cylinder 13 secured to the upper beam 10 and having therein a piston 14 movable by pressure toward the lower beam 11; a reaction base 15 movably mounted upon the lower beam 11 and having a tubular standard 16 extending toward the jack piston 14; and a liquid pump 17 operable by means of a handle 18 to force liquid into the cylinder 13 through a hose connection 19.

The improved equipment which is associated with the hydraulic press of Figs. 1 and 2, consists primarily of a plunger member 20 detachably and rotatably secured to the piston 14; and a saddle member 21 which is likewise detachably and rotatably secured to the base standard 16.

The plunger member 20 which is normally carried by the threaded end of the piston 14 and is adjustably rotatable about the piston axis, is shown in detail in Fig. 3, and has one end provided with a threaded socket 22 while its opposite end is rounded to form a work engaging head 23 the medial portion of which is interrupted by a notch 24. The bead 23 extends transversely across and is disposed in the plane of the axis of the socket 22 and piston 14, and the notch 24 may be of any desired shape and size and is preferably located midway between the opposite ends of the bead 23.

The saddle member 21 is shown in detail in Figs. 1 and 2, and comprises a substantially rectangular block of metal having a threaded socket 25 adapted for attachment to the base standard 16 or other carrying element, while permitting rotary adjustment of the block about the socket axis. The work engaging face of the saddle member 21 is provided with a curved concavity 26 and with laterally spaced parallel rounded beads 27, as clearly illustrated in Fig. 2; and the curved concavity 26 is connected to the beads 27 by means of approximately plane inclined surfaces 28. The beads 27 are preferably spaced equidistant from the central axis of the socket 25, and when the saddle member 21 is associated with a jack or press, the axis of the socket 25 should substantially coincide with the central axis of the saddle base or other saddle support.

During normal use of the apparatus shown in Figs. 1 and 2, the plunger member 20 may be disposed either with its work engaging bead 23 parallel to the beads 27 of the saddle member 21 as in Fig. 1, or with the bead 23 substantially normal to the beads 27 as in Fig. 2, or with these beads 23, 27 disposed at oblique angles relative to each other. The base 15 may be shifted with its standard 16 along the lower frame beam 10, and the damaged bumper 29 may be positioned between the members 20, 21 as desired, while these members are separated. In order to remove long bends or dents, it is preferable to have the damaged bumper 29 disposed relative to the members 20, 21 as illustrated in Fig. 1; and when hydraulic pressure is applied within the cylinder 13 by manipulation of the pump 17, the plunger member 20 will force the adjacent bent portion of the bumper 29 into the concavity 26 of the saddle member 21 and will straighten the bumper longitudinally while at the same time restoring its proper lateral curvature. When the longitudinal distortion has thus been removed, the members 20, 21 and the bumper 29 may be caused to coact as in Fig. 2, and by slight applications of pressure to succeeding portions of the bumper, proper longitudinal or transverse curvature of the bumper 29 may be rapidly restored. The operator will become quickly familiar with the operation and adaptability of the assemblage, and can thus conveniently restore even badly distorted bumpers to their original or normal shape. While the apparatus has been shown in action on a longitudinally and laterally curved bumper 29, it is just as readily applicable for straightening or restoring the shape of other elongated objects.

From the foregoing detailed description it will be apparent that my present invention provides improved repair equipment especially adapted for restoration of the shape of elongated bodies such as bumper bars, which is extremely simple and compact in construction, which may be readily manipulated, and which is moreover highly effective in use. The improved assemblage can be conveniently and safely utilized to either straighten the bumper, or to provide proper curvature thereof in either one or several directions, and while I have shown the attachments applied to hydraulic ram mechanisms, they may also be utilized with a mechanical jack. The saddle member 21 is preferably rotatably adjustable about the axis of its carrying element, and may be supported either from a stationary or movable part of the power applying unit. The improvement has proven highly satisfactory in actual use and has been found far superior to prior straightening tools for like purposes, both as to ease of operation and effectiveness of final results. The improved equipment may be manufactured at moderate cost and can be utilized in conjunction with relatively standard presses or rams now on the market.

It should be understood that it is not desired to limit this invention to the exact details of construction of parts or to the precise mode of use, herein shown and described, for various modifications within the scope of the claims may occur to persons skilled in the art.

I claim:

1. In combination, a press having elements relatively movable toward each other to distort the work and relatively laterally adjustable to vary the zones of pressure application, a plunger member carried by one of said press elements and having a transverse work contacting edge extending across and rotatable about the axis of relative movement of said element, and a saddle member carried by the other of said press elements and having parallel laterally spaced work engaging edges between and across which said plunger element edge is cooperable with the work.

2. In combination with a press having elements mounted upon a normally stationary frame and relatively movable toward each other to distort work located therebetween, a plunger member carried by one of said press elements and having a relatively sharp wedge shaped portion provided with a work engaging edge crossing the axis of relative movement of said elements, and a saddle member carried by the other press element and having approximately parallel work engaging side edges separated by a relatively wide and shallow valley crossing said axis, said members being relatively rotatable about said axis to cause said wedge member edge to coact with an intervening work piece either substantially parallel to or at any angle transversely of said side edges and said wedge edge being of less length than the width of said valley.

3. In combination with a press having elements relatively movable toward each other to distort work located therebetween, a plunger member carried by one of said press elements and having a wedge shaped portion provided with a work engaging edge crossing the axis of relative movement of said elements, and a saddle member carried by the other press element and having approximately parallel work engaging side edges separated by a valley crossing said axis, said members being relatively rotatable about said axis to cause said wedge member edge to coact with an intervening work piece either substantially parallel to or transversely of said side edges and one of said members being adjustable laterally of said axis to change the zones of pressure application.

4. In combination with a press having elements mounted upon a normally stationary frame and being relatively rotatable about an axis and relatively movable toward each other to distort work located therebetween, a relatively sharp wedge shaped plunger member carried by one of said press elements and having a work engaging wedge edge crossing said axis and approximately perpendicular thereto, and a saddle member carried by the other press element and having laterally spaced work engaging side edges separated by a relatively wide and shallow valley crossing said axis, said members by virtue of said relative rotatability of said elements being disposable with said wedge edge either parallel or at any angle to said spaced edges and said wedge edge being of less length than the shortest distance between said saddle member edges.

5. In combination with a press having elements relatively rotatable about an axis and relatively movable toward each other to distort work located therebetween, a wedge shaped plunger member carried by one of said press elements and having a work engaging wedge edge crossing said axis and approximately perpendicular thereto, a saddle member carried by the other press element and having laterally spaced work engaging side edges separated by a valley crossing said axis, said members by virtue of said relative rotatability of said elements being disposable with said wedge edge either parallel or at an angle to said spaced edges, and means for effecting relative adjustment of said members laterally of said axis to change the zone of pressure application.

EDWARD H. SCHULTZ.